(12) United States Patent
Praisner et al.

(10) Patent No.: US 10,294,795 B2
(45) Date of Patent: May 21, 2019

(54) HIGH PITCH-TO-CHORD TURBINE AIRFOILS

(75) Inventors: Thomas J. Praisner, Colchester, CT (US); Matthew B. Estes, South Windsor, CT (US); Renee J. Jurek, Manchester, CT (US); Norbert Huebner, Dachau (DE)

(73) Assignees: United Technologies Corporation, Farmington, CT (US); MTU AERO ENGINES AG, Munich (DE)

( * ) Notice: Subject to any disclaimer, the term of this patent is extended or adjusted under 35 U.S.C. 154(b) by 1491 days.

(21) Appl. No.: 12/768,822

(22) Filed: Apr. 28, 2010

(65) Prior Publication Data
US 2011/0268578 A1 Nov. 3, 2011

(51) Int. Cl.
*F01D 5/14* (2006.01)
(52) U.S. Cl.
CPC ...... *F01D 5/141* (2013.01); *F05D 2220/3215* (2013.01); *Y02T 50/673* (2013.01)
(58) Field of Classification Search
CPC .................................................. F01D 5/141
USPC .......................................... 415/122.1, 241 R
See application file for complete search history.

(56) References Cited

U.S. PATENT DOCUMENTS

| | | | |
|---|---|---|---|
| 5,352,092 A * | 10/1994 | Ferleger et al. | ......... 416/223 A |
| 5,354,178 A | 10/1994 | Ferleger et al. | |
| 5,480,285 A | 1/1996 | Patel et al. | |
| 6,142,739 A * | 11/2000 | Harvey | ......................... 416/235 |
| 6,435,815 B2 | 8/2002 | Harvey et al. | |
| 6,769,878 B1 * | 8/2004 | Parker et al. | ................. 416/243 |
| 7,632,062 B2 | 12/2009 | Harvey et al. | |
| 8,282,354 B2 * | 10/2012 | Spangler | .................. 416/193 A |
| 2007/0084183 A1 * | 4/2007 | Moniz et al. | ................... 60/204 |

FOREIGN PATENT DOCUMENTS

| | | |
|---|---|---|
| EP | 0937862 A1 | 8/1999 |
| WO | WO 2008063152 A2 * | 5/2008 |

OTHER PUBLICATIONS

"Handbook of Turbomachinery" second edition, published by CRC Press 2003 and edited by Earl Logan, Jr. et al. Pertinent p. 686.*

* cited by examiner

*Primary Examiner* — Kayla McCaffrey
(74) *Attorney, Agent, or Firm* — Bachman & LaPointe, P.C.

(57) ABSTRACT

A low pressure turbine engine component for use in an engine, for propelling a vehicle such as an aircraft is formed by a disk portion and a plurality of low pressure turbine blades extending outwardly from the disk portion. Each of the low pressure turbine blades has an airfoil portion with an axial chord length and a trailing edge. The low pressure turbine blades are spaced apart so that there is a pitch-to-chord ratio greater than 1.4, wherein the pitch is a distance between the trailing edges of adjacent ones of the low pressure turbine blades and the chord is the axial chord length of the blades.

9 Claims, 1 Drawing Sheet

HIGH PITCH-TO-CHORD TURBINE AIRFOILS

BACKGROUND

The present disclosure relates to a low pressure turbine engine component having a high pitch-to-chord turbine airfoil configuration.

In typical low pressure turbines used in aircraft engines, the airfoils are arranged so that they have an axial chord length. Further, adjacent ones of the airfoils are arranged to have a pitch which is the distance in a tangential direction between the trailing edges of adjacent blades. Typically, the airfoils are configured to have a pitch-to-chord ratio which is well below 1.3.

SUMMARY

In accordance with the instant disclosure, there is provided a low pressure turbine engine component for use in an aircraft engine which broadly comprises a disk portion, a plurality of turbine blades extending outwardly from said disk portion, each of said turbine blades having an airfoil portion with an axial chord length and a trailing edge, and said turbine blades being spaced apart so that there is a pitch-to-chord ratio greater than 1.4, wherein said pitch is a distance between the trailing edges of adjacent ones of said turbine blades and said chord is the axial chord length of said blades and the pitch-to-chord ratio is measured at the mid-span of the blades.

Further, in accordance with the instant disclosure, there is provided a gas turbine engine for propelling a vehicle which broadly comprises at least one compressor stage and at least one low pressure turbine stage, and said at least one low pressure turbine stage being formed by a disk portion, a plurality of low pressure turbine blades extending outwardly from said disk portion, each of said turbine blades having an airfoil portion with an axial chord length and a trailing edge, and said turbine blades being spaced apart so that there is a pitch-to-chord ratio greater than 1.4, wherein said pitch is a distance between the trailing edges of adjacent ones of said turbine blades and said chord is the axial chord length of said blades, and wherein the pitch-to-chord ratio is measured at the mid-span of the turbine blades.

Other details of the high pitch-to-chord turbine airfoils are set forth in the attached detailed description and the accompanying drawings.

DETAILED DESCRIPTION OF THE PREFERRED EMBODIMENT(S)

Figure 1:
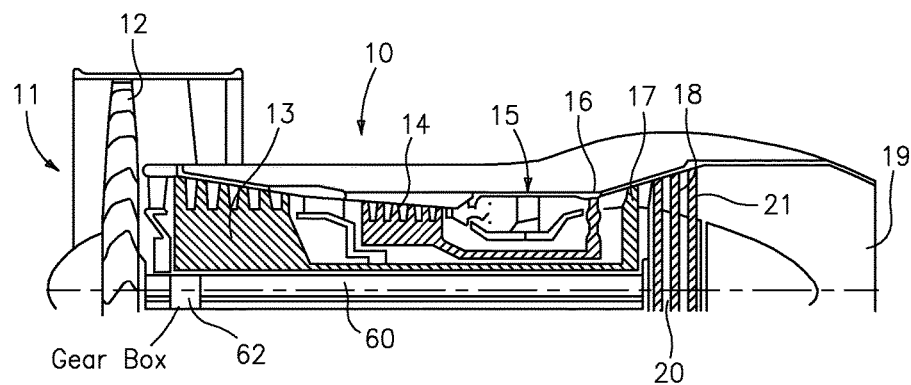
FIG. 1 is a sectional view of a gas turbine engine.

Referring now to the drawings, FIG. 1 illustrates a geared gas turbine engine which may be used to propel a vehicle such as an aircraft. The engine is generally indicated at 10 and comprises, in axial flow series, an air intake 11; a propulsive fan 12, an intermediate pressure compressor 13, and a high pressure compressor 14 for compressing air which has been taken into the engine; a combustor 15, a turbine arrangement comprising a high pressure turbine 16, an intermediate pressure turbine 17, and a low pressure turbine 18; and an exhaust nozzle 19. As can be seen from FIG. 1, the low pressure turbine 18 has a disk portion 20 and a plurality of rows of low pressure turbine blades 21 extending outwardly therefrom. The low pressure turbine 18 may be shrouded or unshrouded. The low pressure turbine 18 is connected to the fan 12 by a shaft 60. Incorporated into the shaft/spool 60 is a gearbox 62 which allows the shaft/spool 60 as well as the low pressure turbine 18 to be decoupled from the fan 12. When decoupled from the fan 12, the low pressure turbine 18 rotates at a much higher speed than ordinary low pressure turbines in engines where the low pressure turbines can not be decoupled from the fan 12. As a result, the velocity ratio, i.e the ratio of the velocity of the air exiting the outlet 66 compared to the velocity of the air entering through the inlet 64, is much higher than the non-geared turbine engines. In fact, non-geared turbine engines do not have the high velocity ratios seen in the geared turbine engines. As a result, they operate in a different fluid dynamic regime.

Each low pressure turbine blade 21 may have a root portion (now shown). Further, each low pressure turbine blade 21 may be mounted to the disk portion 20 via the root portion using any suitable attachment system known in the art. The low pressure turbine blades 21 may be formed from any suitable material known in the art, such as a nickel based superalloy. If desired, each low pressure turbine blade 21 may also have a platform (not shown).

Each low pressure turbine blade 21 has an airfoil portion 25 which has a leading edge 27 and a trailing edge 29. Each low pressure turbine blade 21 has an axial chord 31 which is the distance from the leading edge 27 to the trailing edge 29 in an axial direction 24.

In accordance with the instant disclosure, adjacent ones of the low pressure turbine blades 21 used to form the low pressure turbine 18 are spaced apart in a pitchwise direction 33 to have a minimum pitch-to-chord ratio above 1.4. As used herein, the term "pitch" refers to the distance 35 between the trailing edges 29 of adjacent turbine blades 21 in the pitchwise direction 33, which is the tangential direction, at the mid-span of the low pressure turbine blades.

Figures 2, 3:
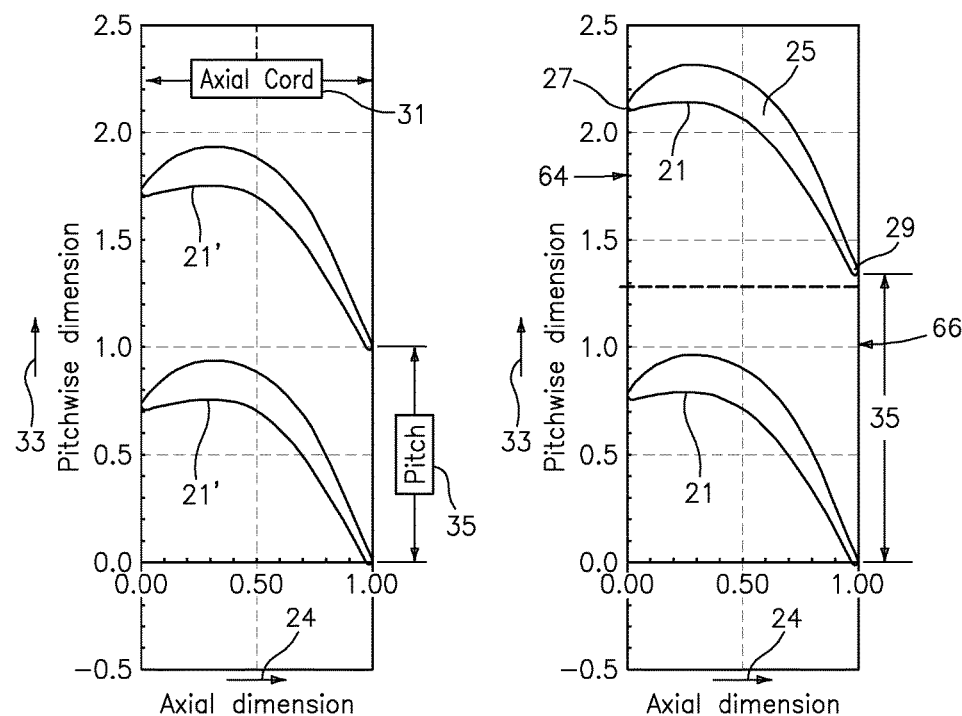
FIG. 2 is an illustration of a turbine blade configuration having a pitch-to-chord ratio greater than 1.4.
FIG. 3 is an illustration of a conventional turbine blade configuration having a pitch-to-chord ratio less than 1.3.

FIG. 2 illustrates the spacing of a pair of low pressure turbine blades 21 in accordance with the instant disclosure at a pitch-to-chord ratio of more than 1.4. FIG. 3 illustrates the spacing of a pair of low pressure turbine blades 21' in a conventional design at a pitch-to-chord ratio of less than 1.3.

Using a pitch to chord ratio of greater than 1.4 is advantageous for a number of reasons. First, the use of such a configuration reduces cost and weight of the turbine engine component because of the reduced airfoil count. An additional benefit is improved efficiency. For example, if active cooling is required for specific applications, the use of an arrangement having a pitch-to-chord ratio above 1.4 would result in reduced turbine airfoil cooling air requirements due to the fewer number of low pressure turbine blades 21, which in turn improves the efficiency of the low pressure turbine engine component. Additionally, having fewer turbine blades 21 will result in reduced leakage air and less parasitic loss. High pitch to chord airfoil designs when used in a low pressure turbine may also enable total stage weight to be reduced which would also translate into reduced TSFC. Total engine cost would also be reduced since there would be fewer low pressure turbine blades 21 to cast, grind, machine, hole drill, and coat. Using fewer low pressure turbine blades 21 is also advantageous because it allows the airfoil portions 25 of the blades 21 to be coated more easily due to the fact that the geometry would have an improved line of sight.

It is apparent that there has been provided by the present disclosure a high pitch-to-chord ratio turbine engine component. While the turbine engine component has been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A geared gas turbine engine for propelling a vehicle, said engine comprising:
    a single geared gas turbine engine propulsive fan and at least one geared gas turbine engine low pressure turbine stage;
    said fan and said at least one low pressure turbine stage being connected by a shaft;
    a geared gas turbine engine gearbox incorporated into said shaft, said gearbox configured to rotationally decouple said at least one low pressure turbine stage and said shaft from said single geared gas turbine engine propulsive fan, wherein said at least one geared gas turbine low pressure turbine stage and said shaft decouple to rotate at higher speed than said single geared gas turbine engine propulsive fan; and
    said at least one low pressure turbine stage being formed by a disk portion, a plurality of low pressure turbine blades extending outwardly from said disk portion, each of said low pressure turbine blades having an airfoil portion with an axial chord length and a trailing edge, and said turbine blades being spaced apart so that there is a pitch-to-chord ratio greater than 1.4, wherein said pitch is a distance between the trailing edges of adjacent ones of said turbine blades and said chord is the axial chord length of said blades, and wherein said pitch-to-chord ratio is measured at a mid-span of said blades, and said low pressure turbine blades including a high velocity ratio, said high velocity ratio being the ratio of the velocity of air exiting a turbine blade outlet proximate the trailing edge compared to the velocity of the air entering a low pressure turbine blade inlet opposite said outlet of said blades.

2. A geared gas turbine engine according to claim 1, wherein said plurality of blades is arranged in a row.

3. A geared gas turbine engine according to claim 1, wherein said plurality of blades are arranged in a plurality of rows and said blades in each said row have said pitch-to-chord ratio greater than 1.4.

4. A geared gas turbine engine according to claim 1, wherein each said blade is formed from a nickel based superalloy material.

5. A geared gas turbine engine according to claim 1, wherein each of said low pressure turbine blades is unshrouded.

6. A geared gas turbine engine low pressure turbine engine component for use in a geared gas turbine aircraft engine comprising:
    a disk portion;
    a plurality of geared gas turbine engine low pressure turbine blades extending outwardly from said disk portion, each of said geared gas turbine engine low pressure turbine blades having an airfoil portion with an axial chord length and a trailing edge;
    said geared gas turbine engine low pressure turbine blades being configured to create a flow of air having a high velocity ratio, said flow of air entering an inlet and exiting an outlet opposite said inlet, said outlet proximate said trailing edge, said high velocity ratio being the ratio of the velocity of the air exiting the outlet compared to the velocity of the air entering the inlet;
    said geared gas turbine engine low pressure turbine blades being spaced apart so that there is a pitch-to-chord ratio greater than 1.4, wherein said pitch is a distance between the trailing edges of adjacent ones of said geared gas turbine engine low pressure turbine blades and said chord is the axial chord length of said geared gas turbine engine low pressure turbine blades and wherein the pitch-to-chord ratio is measured at the mid-span of said geared gas turbine engine low pressure turbine blades.

7. The geared gas turbine engine low pressure turbine component of claim 6, wherein said plurality of geared gas turbine engine low pressure turbine blades are arranged in a row.

8. The geared gas turbine engine low pressure turbine component of claim 6, wherein said plurality of geared gas turbine engine low pressure turbine blades are arranged in a plurality of rows and said blades in each row have said pitch-to-chord ratio greater than 1.4.

9. The geared gas turbine engine low pressure turbine component of claim 6, wherein each said blade is formed from a nickel based superalloy material.

* * * * *